United States Patent [19]

Downing, Jr.

[11] 4,113,045

[45] Sep. 12, 1978

[54] ALL-ELECTRIC A.C. TRACTOR

[76] Inventor: James H. Downing, Jr., Rte. 2, Box 90, Louisa, Va. 23093

[21] Appl. No.: 769,378

[22] Filed: Feb. 16, 1977

[51] Int. Cl.² .............................................. B60L 11/08
[52] U.S. Cl. .................................. 180/65 C; 318/171; 180/6.48
[58] Field of Search ...................... 180/6.48, 6.5, 65 R, 180/65 C; 318/171, 175

[56] References Cited

U.S. PATENT DOCUMENTS

| | | | |
|---|---|---|---|
| 3,577,050 | 5/1971 | Ringland | 318/171 X |
| 3,659,672 | 5/1972 | Jacobus | 180/65 C |
| 3,713,504 | 1/1973 | Shimer | 180/65 R |
| 3,865,209 | 2/1975 | Aihara | 180/65 C |

Primary Examiner—Robert R. Song
Assistant Examiner—Gene A. Church
Attorney, Agent, or Firm—Sughrue, Rothwell, Mion, Zinn and MacPeak

[57] ABSTRACT

A modular farm tractor whose wheels are driven by individual A.C. induction motors and whose accessories or attachments are also driven by A.C. induction motors. A prime mover, such as a gas turbine operating at a constant speed, is mounted on the tractor and drives a three-phase alternator which produces A.C. power at a constant frequency of 400 Hz. The frequency of the power applied to the wheel motors is controlled by a first cycloconverter means connected to the output of the alternator. The alternator output is also coupled through a second cycloconverter means to an A.C. power outlet mounted on the tractor. Various farm accessories associated with the tractor are driven by A.C. induction motors connected to the A.C. outlet. The frequency of the power applied to the accessory motors is controlled by the second cycloconverter means. A material-transferring tunnel runs between the front and rear of the tractor along the center line thereof and between the tractor's wheels.

12 Claims, 6 Drawing Figures

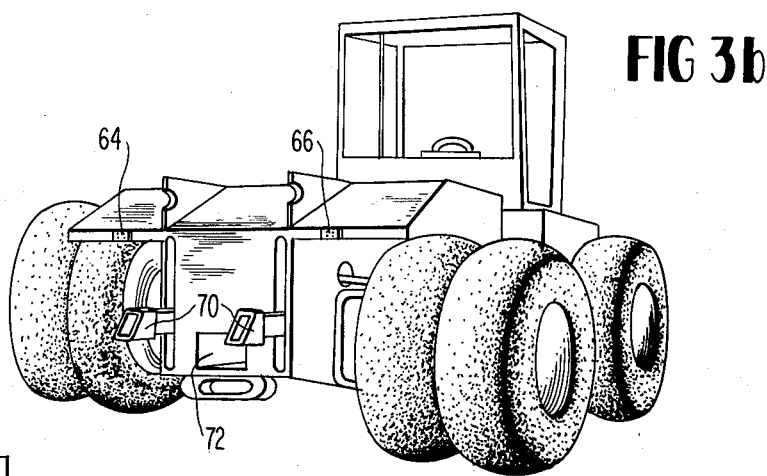
FIG 3b
FIG 3c
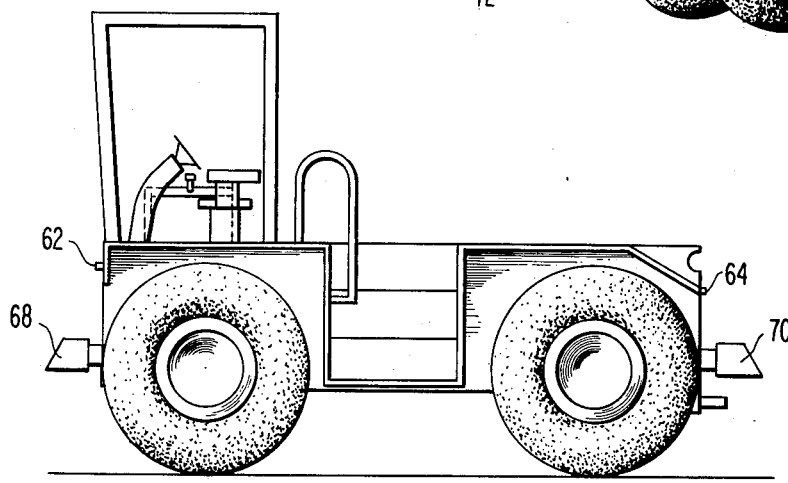
FIG 4
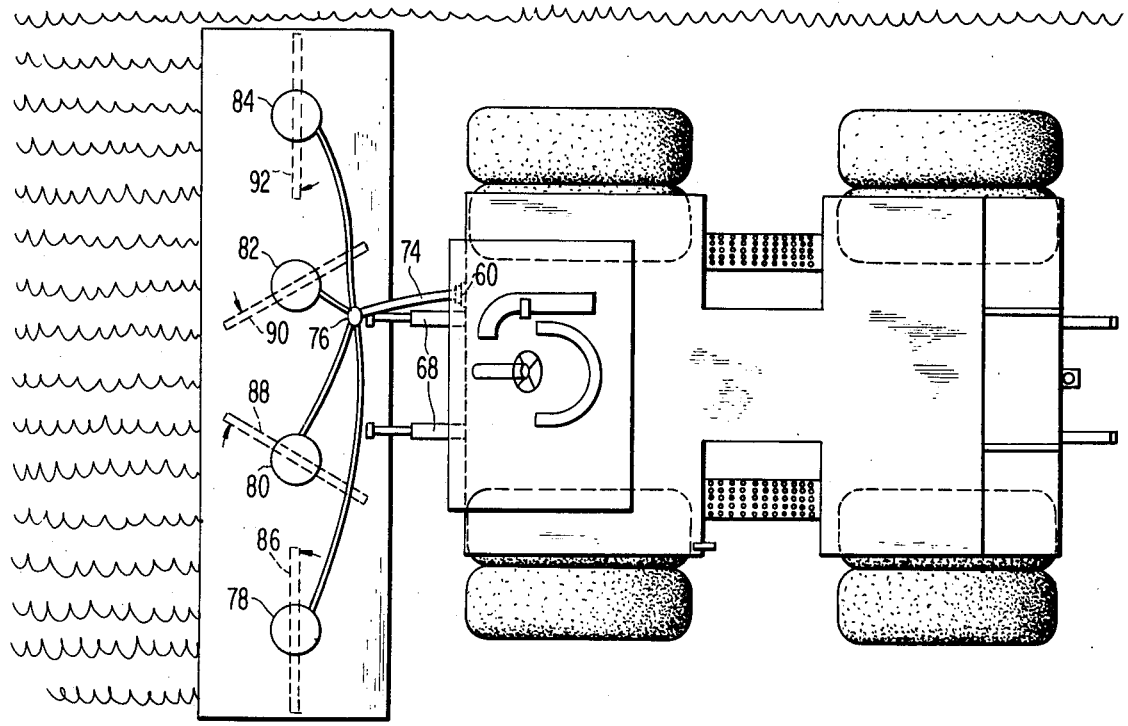

ALL-ELECTRIC A.C. TRACTOR

BACKGROUND OF THE INVENTION

1. Field of the Invention

This invention relates generally to the field of farm tractors having accessories driven by power supplied by the tractor, and, more particularly, to an all-electric tractor having means for driving both the tractor's wheels and accessories by controllable A.C. induction motors.

2. Description of the Prior Art

The wheels of farm tractors have traditionally been driven by internal combustion engines through mechanical coupling means, including complex transmissions. Furthermore, accessories were mechanically driven by a power-take-off (PTO) driven by the engine. It is also known generally to drive the wheels of a land vehicle by A.C. induction motors controlled by cycloconverters. In addition, there has recently been developed a log stacker whose wheels are driven by D.C. motors and whose log handling mechanism is driven by A.C. motors. Also, there has been disclosed the concept of driving the wheels of both a truck and its trailer by individual wheel motors powered by a generator located in the truck.

SUMMARY OF THE INVENTION

The primary object of this invention is to provide an all-electric A.C. modular tractor system wherein both the tractor's wheels and its accessories are driven by controllable A.C. induction motors.

Another object of the invention is to provide such a tractor wherein the wheel and accessory A.C. motors are controlled, respectively, by two different cycloconverters supplied by a single A.C. source mounted on the tractor.

Still another object of the invention is to provide such a tractor having controllable A.C. power available at a power outlet to which various A.C. motor-driven accessories may be electrically connected.

A further object is to provide an all-electric tractor which functions as the basic building block for a complete system of modular agricultural, transportation and construction equipment.

BRIEF DESCRIPTION OF THE DRAWING

FIGS. 3a, 3b and 3c are generally front, rear and side views, respectively, of a farm tractor embodying this invention.

FIG. 4 is a top view of such a farm tractor mechanically and electrically coupled to a typical tractor accessory, i.e., a bush hog.

DESCRIPTION OF THE PREFERRED EMBODIMENT

Figure 1:
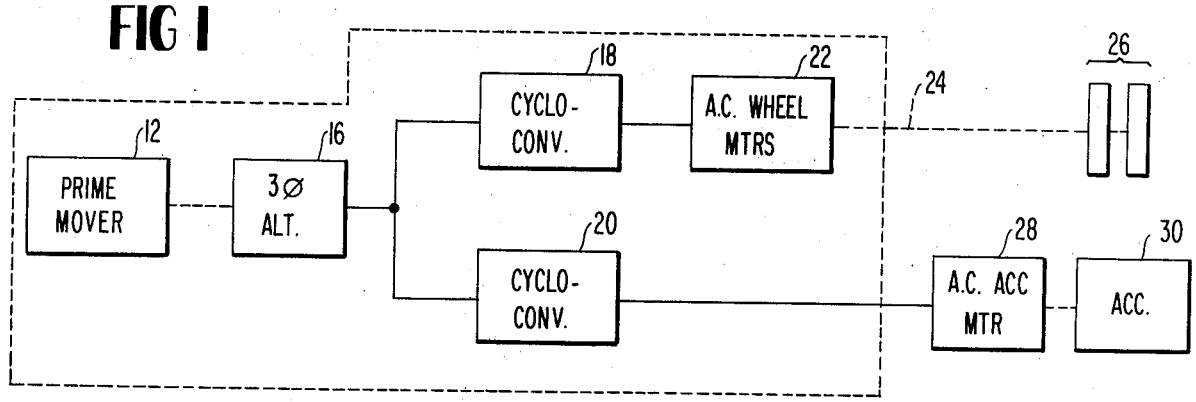
FIG. 1 is a schematic diagram illustrating the invention in its broadest form.

FIG. 1 is a schematic diagram illustrating the basic concept of the invention. As illustrated, a tractor 10 has mounted thereon a constant-speed prime mover 12, such as a gas turbine, which is mechanically coupled via a shaft 14 to a three-phase alternator 16. The three-phase A.C. power from the alternator is fed in parallel to two cycloconverters 18 and 20 which are capable of varying the frequency of the three-phase power.

The output of cycloconverter 18 is electrically coupled to individual three-phase A.C. induction motors 22 which are mechanically coupled via shafts 24 to the tractor wheels 26.

The output of cycloconverter 20 is electrically coupled to the input of a three-phase A.C. induction motor 28 which is mechanically coupled via a shaft to a tractor accessory 30 which is driven or operated by the motor 28.

The advantage of the all-electric A.C. tractor system illustrated in FIG. 1 is that the mechanical PTO and transmissions of conventional tractors are eliminated, and the power required for driving the tractor wheels and the accessory is in the form of three-phase A.C. power which is coupled via electrical conductors to the wheel motors and to the accessory motors.

The speed of the wheel motors 22 is controlled by the cycloconverter 18 which varies the speed of the A.C. motors 22 by varying the frequency of the A.C. power delivered by the alternator 16. Similarly, the speed of the A.C. accessory motor 28 is independently controlled by the cycloconverter 20.

Since a prime mover, such as a gas turbine, operates extremely efficiently when running at a constant speed, great economy is achieved. Typically, the prime mover 12 and alternator 16 would be selected such that the three-phase power delivered by the alternator has a relatively high frequency, such as 400 Hz, thereby keeping the A.C. motors 22 and 28 relatively small in size. Prior art D.C. motors are very bulky, heavy and expensive in comparison to such three-phase A.C. induction motors designed to operate in the 400 Hz range. A further advantage of the system illustrated in FIG. 1 is that the electrical power flows to the motor having the greatest load, i.e., having the greatest resistance to rotation, as compared to prior art mechanical and hydraulic systems wherein power tends to flow to the wheel under least load.

Figure 2:
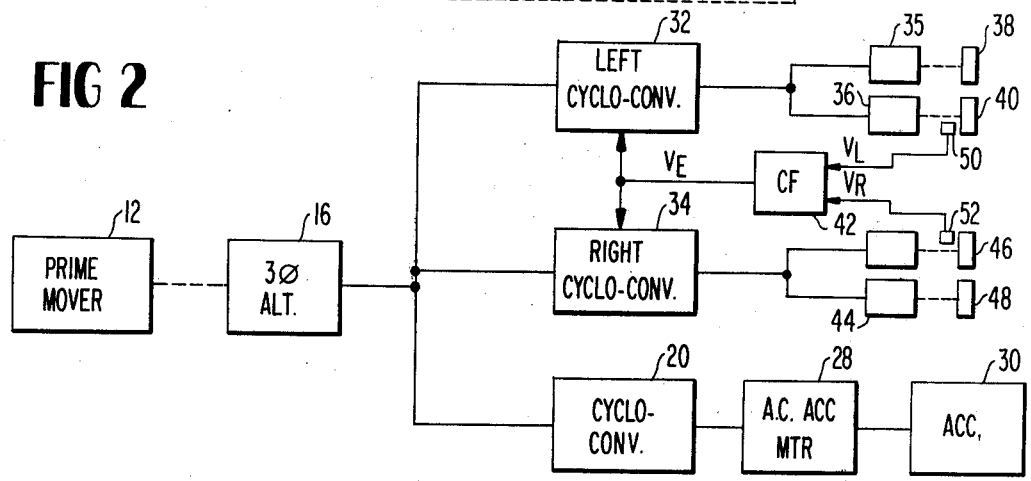
FIG. 2 is a schematic diagram illustrating more details of the invention.

FIG. 2 is a schematic diagram illustrating a further refinement of the basic invention illustrated in FIG. 1. Here again, there is illustrated the constant speed prime mover 12 driving a three-phase alternator 16. Connected in parallel to the output of the alternator are the accessory cycloconverter 20, a left cycloconverter 32 and a right cycloconverter 34. The output of cycloconverter 32 is connected to the input of the two left wheel induction motors 35 and 36 which are mechanically coupled to the tractor's left wheels 38 and 40, respectively. Similarly, the cycloconverter 34 is connected to the right wheel motors 42 and 44 which are connected to the front and rear right wheels 46 and 48, respectively. Suitable left and right wheel speed sensors 50 and 52 feed to a comparator 54 electrical signals $V_L$ and $V_R$ which are indicative of the speeds of the left and right wheels, respectively. The comparison signal $V_E$ from the comparator is fed back to the cycloconverters 32 and 34 in order to maintain a desired relationship between the speeds of the left and right wheels.

Figure 3A:
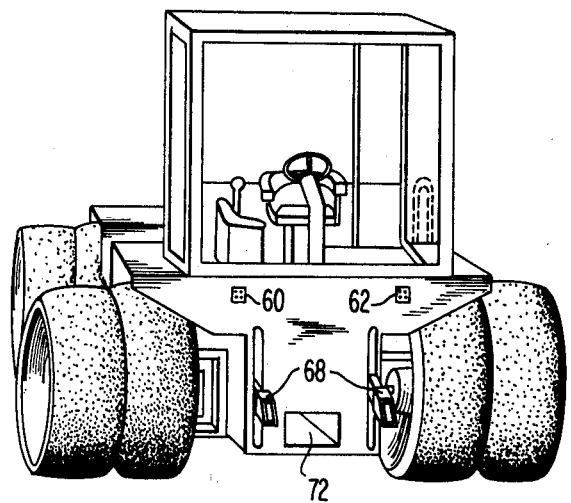

FIGS. 3a, 3b and 3c show generally front, rear and side views, respectively, of a tractor structure embodying the above-described features of the invention. FIG. 3a illustrates the accessory A.C. power outlets or connectors 60 and 62 located on the front of the tractor body, and FIG. 3b illustrates the accessory A.C. power outlets or connectors 64 and 66 located on the rear of the tractor. Also, a pair of forks 68 are mounted on the front of the tractor for pushing a tractor accessory, and another pair of forks 70 are mounted on the rear of the tractor for pulling a tractor accessory.

Because the all-electric A.C. tractor of this invention eliminates the need for the conventional tractor transmission, drive shaft, and cross axles, there is room for a material-transferring or -conveying tunnel 72 which extends along the center of the tractor body, from the front to the rear thereof, and located between the wheels of the tractor.

FIG. 4 shows an embodiment of the invention wherein the accessory is a bush hog mechanically coupled to the front forks 68 and electrically coupled to the A.C. power outlet 60 by a cable 74. This cable is connected via a junction box 76 and individual connector cables to the individual three-phase A.C. induction motors 78, 80, 82 and 84 which are mechanically connected to respective cutter blades 86, 88, 90 and 92.

The bush hog accessory illustrated in FIG. 4 is merely exemplary, and the tractor is designed to accommodate any other accessory, such as a combine head, a windrower, a forage chopper, ground working equipment, etc.

In summary, Applicant has invented a new generation of farm tractor in the form of an all-electric A.C. mobile unit which can serve as a master mobile unit for operating any number of modular accessories. Whereas in the prior art, a farmer might have to have several separate mobile units for performing different tasks requiring different accessories or equipment, with the present invention he need purchase only the all-electric A.C. mobile unit of this invention, and use the same single unit to operate several accessories, either simultaneously or one at a time.

I claim:

1. In combination:
   a land vehicle having a ground-engaging traction means;
   a source of polyphase electrical power mounted on said vehicle;
   first cycloconverter means electrically coupled to said source for providing a first variable frequency polyphase power output;
   polyphase motor means mechanically coupled to said traction means;
   means for energizing said motor means with the first power output from said first cycloconverter means to operate said traction means and drive said vehicle;
   second cycloconverter means electrically coupled to said source for providing a second variable frequency polyphase power output;
   a work-producing device associated with said land vehicle;
   polyphase slave motor means associated with said device; and
   means for energizing said slave motor means with the second power output for operating said device.

2. The combination of claim 1 wherein said traction means comprises:
   two front wheels and two rear wheels;
   sensor means for producing an electric speed signal indicative of the relative speeds of said wheels; and
   means for feeding back said speed signal to said first cycloconverter means for controlling the first power output in accordance with said speed signal.

3. The combination of claim 1 wherein:
   said traction means comprises a first pair of steerable front wheels and a second pair of steerable rear wheels; and
   said traction motor means comprises a polyphase motor mechanically coupled to each wheel; and wherein:
   said first cycloconverter means comprises a left cycloconverter for controlling the power applied to the two left wheels and a right cycloconverter for controlling the power applied to the two right wheels;
   means for producing an electric speed signal indicative of the relative speeds of the left and right wheels; and
   means for feeding the electric speed signal to said first and second cycloconverters for controlling the power applied to said traction motor means.

4. The combination of claim 1 wherein said land vehicle is a farm tractor having a material-transferring tunnel therein extending longitudinally of the tractor between the front and rear thereof and passing between the traction means of the tractor.

5. The combination of claim 1 wherein said device is an accessory device, and further comprising means for mechanically coupling said accessory device to said vehicle.

6. The combination of claim 1 wherein said source of polyphase electrical power is a source of three-phase electrical power.

7. The combination of claim 1 wherein said land vehicle has a material-transferring tunnel therein extending longitudinally of the vehicle between the front and rear thereof and passing between the traction means of the vehicle.

8. An all-electric A.C. farm tractor having a plurality of ground-engaging traction means and comprising:
   a prime mover mounted on the tractor;
   a three-phase A.C. alternator mechanically driven by said prime mover and having an electrical output;
   a three-phase A.C. motor mechanically coupled to each traction means;
   first frequency-varying means electrically coupled between the alternator output and each of said motors for controlling the frequency of the A.C. power applied to the motors;
   an A.C. power connector on the tractor and electrically coupled to the alternator output; and
   second frequency-varying means electrically coupled between said power connector and the alternator output, so that three-phase motor-driven farm accessories can be controllably driven by the controllable A.C. power available at said power connector.

9. A farm tractor as defined in claim 8 further comprising:
   a farm accessory mechanically coupled to the tractor;
   at least one additional three-phase A.C. motor mounted on said accessory for driving the same; and
   means for electrically coupling said additional motor to the controllable A.C. power available at said power connector.

10. A farm tractor as defined in claim 8 wherein said prime mover is a constant-speed prime mover.

11. A land vehicle having a pair of front and rear left wheels and a pair of front and rear right wheels, and comprising a material-transferring tunnel extending from the front to the rear of the vehicle and passing between the two pairs of wheels, said tunnel being closed along its length and open at the front and rear ends thereof.

12. The land vehicle of claim 11, further comprising individual A.C. wheel motors for driving each of the wheels, and an A.C. alternator mounted on said vehicle for supplying A.C. power to the wheel motors.

* * * * *